United States Patent [19]
Goffinet et al.

[11] Patent Number: 6,112,256
[45] Date of Patent: Aug. 29, 2000

[54] METHOD AND APPARATUS FOR CONFIGURING THE PHYSICAL SETUP OF MULTIPLE PRINTERS ON A NETWORK

[75] Inventors: Kevin Patrick Goffinet; Francis Darrell Rafferty, Jr.; Gail Marie Songer; James Francis Webb; Jeffrey Keith Wedinger; Lloyd Phillip Young, all of Lexington, Ky.

[73] Assignee: Lexmark International, Inc., Lexington, Ky.

[21] Appl. No.: 09/246,827

[22] Filed: Feb. 8, 1999

Related U.S. Application Data

[62] Division of application No. 08/906,650, Aug. 7, 1997, Pat. No. 5,905,906, which is a continuation of application No. 08/414,459, Mar. 31, 1995, abandoned.

[51] Int. Cl.[7] .................................................... G06F 3/00
[52] U.S. Cl. ............................. 710/8; 710/10; 710/104; 709/221; 713/100
[58] Field of Search ................................. 710/8–14, 104; 713/1–100; 709/220–222

[56] References Cited

U.S. PATENT DOCUMENTS

| | | | |
|---|---|---|---|
| 3,680,052 | 7/1972 | Arulpragasam et al. | 340/172.5 |
| 5,075,875 | 12/1991 | Love et al. | 395/117 |
| 5,084,875 | 1/1992 | Weinberger et al. | 371/291 |
| 5,153,876 | 10/1992 | Sin | 370/85.1 |
| 5,164,842 | 11/1992 | Gauronski et al. | 358/401 |
| 5,214,772 | 5/1993 | Weinberger et al. | 395/575 |
| 5,220,566 | 6/1993 | Ikenoue | 370/112 |
| 5,220,674 | 6/1993 | Morgan et al. | 395/800 |
| 5,226,112 | 7/1993 | Mensing et al. | 395/114 |
| 5,247,623 | 9/1993 | Sun | 395/325 |
| 5,271,065 | 12/1993 | Rourke et al. | 382/1 |
| 5,303,336 | 4/1994 | Kageyama et al. | 395/114 |
| 5,323,393 | 6/1994 | Barrett et al. | 370/85.8 |
| 5,333,286 | 7/1994 | Weinberger et al. | 395/575 |
| 5,353,388 | 10/1994 | Motoyama | 395/117 |
| 5,361,265 | 11/1994 | Weinberger et al. | 371/29.1 |

(List continued on next page.)

FOREIGN PATENT DOCUMENTS 0 575 168 A1  12/1993  European Pat. Off. .

OTHER PUBLICATIONS

Network Printing Alliance Protocol, A Printer/Host Control Specification, Level 1, Revision N, Feb. 11, 1994, Developed by the Network Printing Alliance.

HP JetDirect Network Interface Configuration Guide, Hewlett–Packard Manual Part No. J2371–90001, 1993, pp. iv–ix and Section 2 Software Installation and Configuration for Novell Netware Networks, pp. 2–2 through 2–18.

HP JetDirect EX External Network Interface Configuration Guide, Hewlett Packard Manual Part No. J2382–90101, 1993, pp. 7–12 and Section 2 Novell NetWare Networks, pp. 2–2 through 2–36.

Lexmark WinWriter 600 User's Reference Manual, 1993, Chapter 2, pp. 11–26, Chapter 3, pp. 27–39.

*Primary Examiner*—Paul R. Myers
*Attorney, Agent, or Firm*—Frederick H. Gribbell

[57] ABSTRACT

A networked system having a host computer and multiple printers with bi-directional communications capabilities is provided in which the setup (configuration) of one printer can be easily communicated to another printer, using NPAP messages. The host computer can be used by a Network Administrator to "read" the setup or configuration information inside each of the printers connected to the network that have the required NPAP bi-directional communications capability. This setup information, once communicated to the host computer, can be stored in a long-term memory, such as a hard disk drive, for future reference. The setup information can also be communicated to one or more printers connected to the network, and such printers can be configured by the setup information in which that information is used either as their initial setup information, or as a modified setup. The Network Administrator can use a single command that specifies precisely which printers are to receive that setup information, and all specified printers will automatically be reconfigured with the new setup.

15 Claims, 7 Drawing Sheets

U.S. PATENT DOCUMENTS

| | | | |
|---|---|---|---|
| 5,371,837 | 12/1994 | Kimber et al. | 395/114 |
| 5,426,421 | 6/1995 | Gray | 340/825.15 |
| 5,438,528 | 8/1995 | Emerson et al. | 364/580 |
| 5,448,624 | 9/1995 | Hardy et al. | 379/67 |
| 5,481,254 | 1/1996 | Gaskill et al. | 340/825.52 |
| 5,481,742 | 1/1996 | Worley et al. | 709/246 |
| 5,491,796 | 2/1996 | Wanderer et al. | 709/224 |
| 5,535,406 | 7/1996 | Kolchinsky | 712/10 |
| 5,546,539 | 8/1996 | Poling | 707/201 |
| 5,550,957 | 8/1996 | Davidson, Jr. et al. | 395/114 |
| 5,583,749 | 12/1996 | Tredennick et al. | 361/790 |
| 5,611,046 | 3/1997 | Russell et al. | 395/115 |
| 5,692,111 | 11/1997 | Marbry et al. | 395/114 |
| 5,771,381 | 6/1998 | Jones et al. | 713/100 |

METHOD AND APPARATUS FOR CONFIGURING THE PHYSICAL SETUP OF MULTIPLE PRINTERS ON A NETWORK

This is a divisional of Ser. No. 08/906,650, filed Aug. 7, 1997 U.S. Pat. No. 5,905,906, which is a continuation of Ser. No. 08/414,459, filed Mar. 31, 1995 (abandoned).

TECHNICAL FIELD

The present invention relates generally to the use of multiple printers connected to a network and is particularly directed to a network containing at least one host computer. The invention is specifically disclosed as a method for configuring multiple printers (i.e., typically laser printers) from a host computer, all connected through a network.

BACKGROUND OF THE INVENTION

Printers receive print data from a source, such as a single host computer, or a network that contains at least one host computer or network server. Printers that are connected to a network can serve more than one host, and a single host computer connected to a network can access more than one printer.

A recent development with respect to laser printers is the use of an internal network adapter that allows bi-directional communication with host computers over the network. Such bi-directional communication would typically be made using a protocol known as the Network Printer Alliance Protocol (NPAP) which provides a means for returning status information from a laser printer to a host computer. The bi-directional capabilities of such laser printers, particularly IBM Model 4039 Plus, manufactured by Lexmark International, Inc., are quite broad, and can be further enhanced by creating a function that allows a Systems Administrator or a Network Administrator to easily setup new printers to be added to the network.

SUMMARY OF THE INVENTION

Accordingly, it is a primary object of the present invention to provide a networked system that includes a host computer and multiple printers in which the printers are capable of allowing the host computer to easily and accurately setup one or more of the printers connected to the network, via commands entered via a Network Administrator working at the host computer.

It is another object of the present invention to provide a networked system having a host computer and multiple printers in which the setup or configuration residing in a particular printer can be communicated to the host computer and stored in a file at that host computer.

It is a further object of the present invention to provide a networked system having a host computer and multiple printers in which the printer configuration or setup of multiple printers connected to the network can be either initialized or modified by a single command by the Network Administrator working at the host computer.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved networked system having a host computer and multiple printers is provided in which the printers have a bi-directional data communications capability. Such printers preferably meet the standards of the Network Printer Alliance Protocol (NPAP) which defines an industry standard for bi-directional communications between a host computer and a printer, either over a network, or directly between such computer and printer. In the present invention, one host computer can be used by a Network Administrator to "read" the setup or configuration information inside each of the printers connected to the network that have the NPAP bi-directional communications capability. This setup information, once communicated to the host computer, can be stored in a long-term memory, such as a hard disk drive, for future reference.

The setup information can also be communicated to one or more printers connected to the network, and such printers can be configured by the setup information in which that information is used either as their initial setup information, or as a modified setup. The setup information to be transmitted to such printers on the network is preferably retrieved from a file that resides on the long-term storage (such as a hard disk drive) of the host computer, and this information can be communicated to any number of the printers that are connected to the network. In this way, the Network Administrator can setup one particular printer with its configuration information (i.e., its setup), store that configuration on the hard disk drive of the host computer, and later transfer that same configuration information to as many printers connected to the network as desired, all by one command that specifies precisely which printers are to receive that setup information.

The format for the setup configuration commands is preferably in accordance with the NPAP industry standard, particularly the portion of the standard that allows for additional applications such as the "Quick Setup" procedure of the present invention. To "read" the configuration information within a particular printer manufactured by Lexmark International, Inc., the host computer would send a command of the following general format:

A5 00 06 50 E0 E7 00 [oid1] [oid2].

If the printer is a laser printer of the type manufactured by Lexmark International, Inc. having the model designation 4039 plus, or Optra, it will generate a response message, having the format as follows:

A5 00 xx 50 E0 E7 00 [oid1] [oid2] [data].

When the host computer desires to set the configuration of a particular Lexmark printer oil the network, the host computer would send a command of the following format:

A5 00 xx 50 E0 E7 01 [oid1] [oid2] [data].

The terms "oid1" and "oid2" are identification numbers assigned to each variable in the printer. It should be noted that the size (in bytes) of the response message from the printer depends upon which specific variable of the configuration information has been queried by the lost computer. The details of these variables are described hereinbelow.

Still other objects of the present invention will become apparent to those skilled in this art from the following description and drawings wherein there is described and shown a preferred embodiment of this invention in one of the best modes contemplated for carrying out tile invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
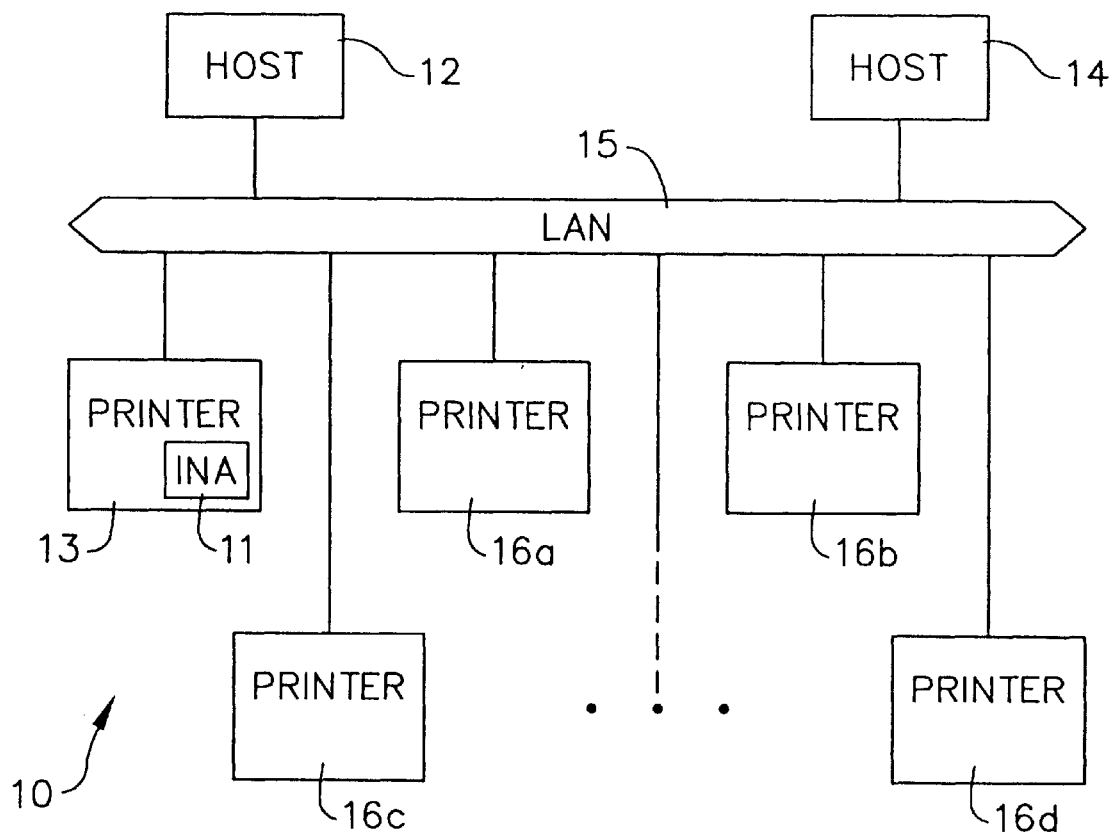
FIG. 1 is a diagrammatic view of a network system having multiple host computers and multiple printers, as relevant to the present invention.

Referring now to the drawings, FIG. 1 shows an exemplary interface between multiple host computers 12 and 14 and multiple printers, generally designated by the index numerals 13, 16a, 16b, 16c, and 16d. Printer 13 includes an internal network adapter (INA) 11, located within the printer housing and the other printers also preferably include such an INA. INA 11 is connected to host computers 12 and 14 through a network, such as the local area network (LAN) designated by the index numeral 15. INA 11 is preferably of a type described in a co-pending commonly-assigned U.S. patent application, Ser. No. 08/350,860, titled MULTIPLE VIRTUAL PRINTER NETWORK INTERFACE, filed on Dec. 7, 1994, and which is expressly incorporated by reference herein.

The host computers 12 and 14 can be installed in close proximity to one or more of the printers of FIG. 1, however, when operated according to the principles of the present invention, such host computers can be located quite remote from these printers. The overall system, generally designated by the index numeral 10, can be spread in practical use across an entire building, or across several buildings. Each of the printers 13, 16a, 16b, 16c, and 16d, may be of the same type or of different models, but are preferably manufactured by Lexmark International, Inc. located in Lexington, Ky.; such preferred printers can be either monochromatic, such as Lexmark models 4039 plus, or Optra™, or could be color printers such as the model 4079 plus.

In all cases, it is preferred that the printers of system 10 have bi-directional capabilities and that they operate according to the industry standard known as the Network Printing Alliance Protocol (NPAP). The NPAP includes a capability in which a particular manufacturer can provide optional features using "extensions," in which each extension includes a command that will be properly understood only by that particular manufacturer's printer. For example, extensions used by Lexmark printers may include in each data packet communicated over the LAN 15 a command byte having a value of E0 in hexadecimal. Printers manufactured by Lexmark International Inc. will respond to such commands written under the Lexmark extension, but printers manufactured by other companies would usually ignore any packet that contained the E0 command byte.

Figure 2:
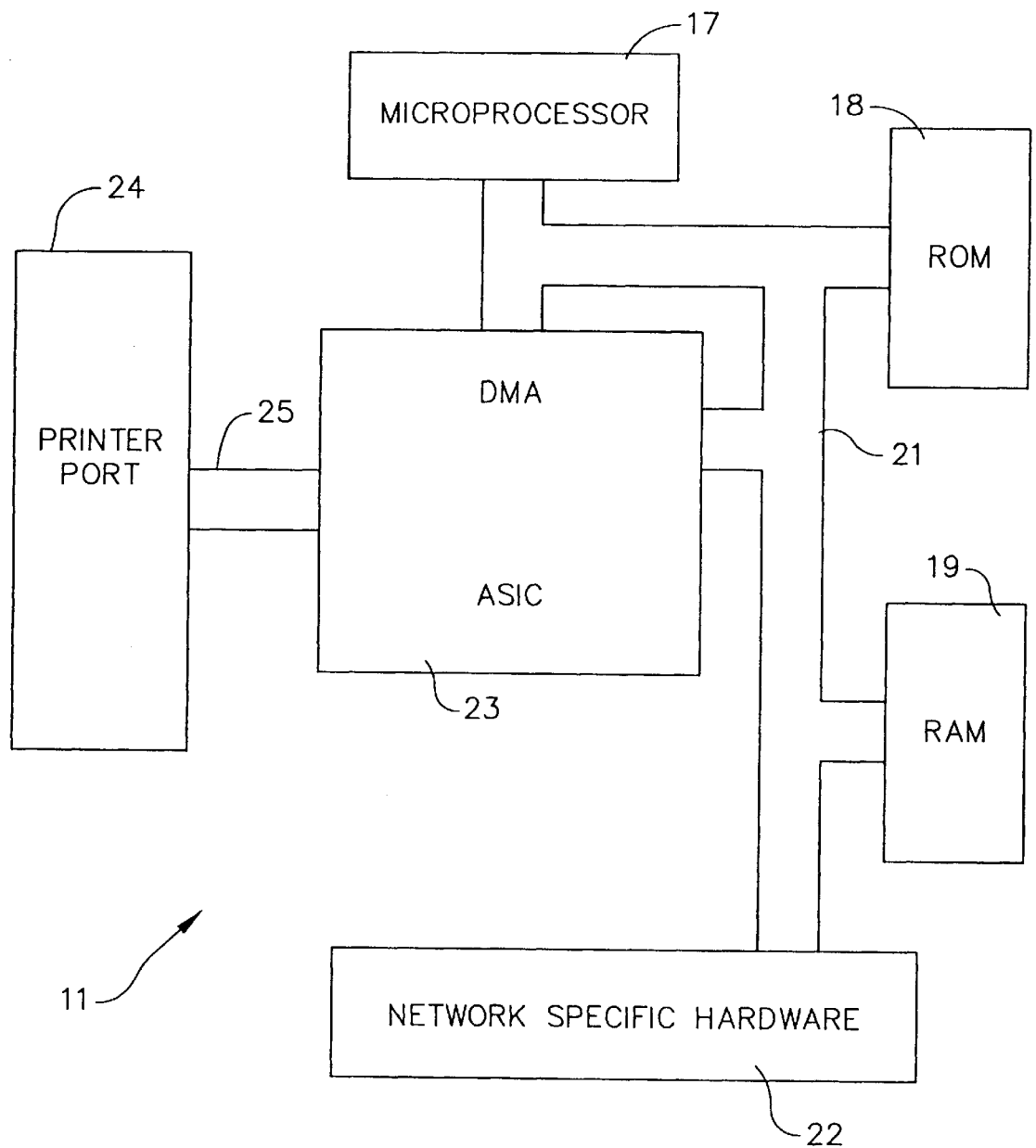
FIG. 2 is a block diagram of the internal network adapter that resides inside the printers of FIG. 1.

Referring now to FIG. 2, the internal network adapter (INA) 11 includes a microprocessor 17 and associated read only memory (ROM) 18 and random access memory (RAM) 19, accessible to the microprocessor on a bus 21. In the present form of adapter, the microprocessor 17 is an Intel 80186 microprocessor; and host data received at a network specific hardware interface 22 is transferred by a direct memory access (DMA) controller ASIC 23 into the RAM 19. The DMA operation may be controlled by the microprocessor 17 or by the network specific hardware 22, dependent upon the network hardware platform to which the INA 11 is attached. Data read from the network specific hardware 22 into the RAM 19 is subsequently transferred across a printer port 24 by the DMA controller ASIC 23.

In the illustrated system, the network operating system is Novell Netware 2.2 or 3.11 or later. As shall be described subsequently, the host computers operating on the Novell Operating System network are set up to send NPAP-compliant commands to a particular "socket", or logical address, of the network specific hardware 22. Therefore, non-NPAP information, received at a different socket, can be transferred to the printer port 24 without processing in the manner that NPAP commands are processed by the microprocessor 17. The NPAP information is processed by the microprocessor 17 in accordance with the present invention, as shall be described subsequently.

To communicate data to the printer port 24, the data is presented on data lines, and one mode of a number of modes of communication is established by command lines. The data lines and command lines are collectively designated 25. Settings of the command lines can place the port 24 into data mode, menu mode, NPAP status mode or Device Status Alert (DSA) mode. In data mode, data is transferred across the printer port 24 to provide page information for print jobs. In menu mode, printer operator panel information is transferred across the printer port 24 from the printer controller to the INA. In NPAP status mode, NPAP-compliant commands are sent from the INA to the printer controller over the printer port 24, with the port remaining in NPAP status mode until an appropriate response is received from the printer controller. In setting DSA mode, the INA responds to a request from the printer controller to be allowed to send a status alert. To do this the INA sets the printer port into DSA mode so that the printer can send the Device Status Alert to the INA.

Figure 3:
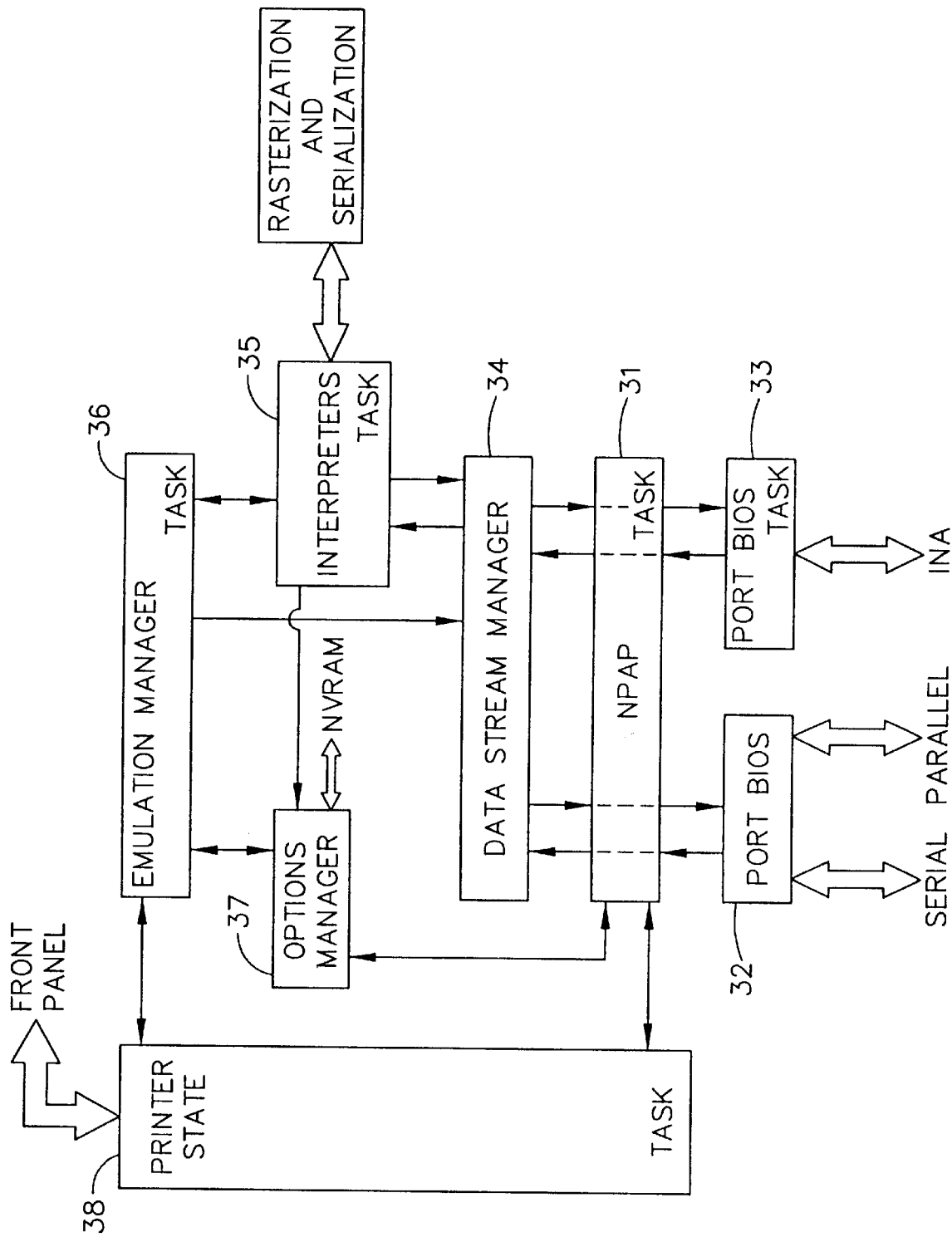
FIG. 3 is a functional block diagram of a controller for the printers depicted in FIG. 1, as relevant to the present invention.

With reference now to FIG. 3, a laser printer for use with the present invention includes a printer controller, the relevant portions of which are shown functionally. The microprocessor-based controller performs functions which include a number of tasks, the relevant ones of which are indicated in the e figure, and a number of libraries o f code which may be called by the tasks to perform various functions. The tasks are activated by timer counts or interrupts to perform functions, as shall be described.

The exemplary printer controller is capable of effecting the usual printer functions such as maintaining a control panel, interpreting incoming print jobs received in one or more printer control languages, and rasterizing and serializing the interpreted data to drive a laser printer engine. The exemplary controller includes the ability to communicate through parallel, serial and network port s bi-directionally using NPAP. The principal task for handling NPAP-compliant commands and data is the NPA Task 31.

The NPA Task 31 performs the functions of handling commands and data in the NPAP (Network Printing Alliance Protocol) format. The NPA Task supplies printer status information to direct attached and network attached host computers and receives requests for such information from the host computers. The NPA Task 31 is activated periodically by a timer, and when it is activated the NPA Task calls the Port BIOS 32 for the serial and parallel ports and the Port BIOS 33 for the INA port to determine if there is received data at one o r more of the e ports. If an NPA command is received, the NPA Task 31 responds through the appropriate port either directly or after obtaining needed information from a another function in the p inter controller. Before describing operation of the NPA Task in more detail, its state as being active or inactive will be described.

The NPA Task may be "on", "off" or "auto" for each port, serial, parallel or INA. If the NPA T ask is off, print data is directly provided from the Port BIOS 32 or 33 to the Data Stream Manager, as shall be described. If the NPA Task is on, then only data in NPAP format will be passed through (after removal of NPAP wrappers) to the Data Stream Manager, with other inputs being rejected. If the NPA Task is in auto mode, then non-NPAP data will be passed through, and the NPA Task processes NPAP commands and data.

When none of the interpreters 35 are running to provide data for subsequent rasterization and serialization in the printer, the Emulation Manager Task 36 looks for print data at a port to direct to the appropriate interpreter. In the absence of the NPA Task 31, the Emulation Manager 36 calls Data Stream Manager 34 functions to transfer print data from the Port BIOS 32 or 33 to a buffer. If the NPA Task is on for a particular port, the Data Stream Manager 34 accesses data from an NPA Task buffer for that port. The Emulation Manager and Data Stream Manager also cooperate to associate a "job structure" with each print job received at a port. The job structure includes an identification number for the print job, the number of pages to be printed, and information on resolution and other specifics. The job structure data is also capable of being modified during the printing process to update the status of the job.

The Emulation Manager 36 also cooperates with the Data Stream Manager 34 to route each print job to the appropriate interpreter (such as a PostScript or a PCL interpreter) for that print job. The Data Stream Manager passes the print job data in the appropriate language to the selected interpreter until the end of the job, when the Data Stream Manager provides an end-of job condition to the interpreter. When the interpreter is finished with the print job, it indicates this to the Emulation Manager Task, so that the job structure data can be modified if desired. The interpreted print jobs are provided on a page by page basis to graphics engine software and print mechanism hardware for eventual rasterization of the pages to be printed and serialization of the bit map information to the print mechanism.

The Options Manager Library 37 provides a high level interface through NVRAM BIOS to non-volatile RAM in the printer. Options Manager 37 is used by the Emulation Manager Task 36 in creating job structure information where such information is derived from NVRAM values. The NPA Task 31 also can communicate with the Options Manager 37 to read and write NVRAM settings.

The Printer State Task 38 first learns of outside (to the controller code) events occurring in the printer. The Printer State Task 38 notes, for example, if the printer cover has been opened and orchestrates providing this information to the front panel and to any other users of such information such as the NPA Task 31. The Printer State Task will become aware of certain conditions due to hardware interrupts to the processor, while other status information is checked by the Printer State Task 38 on a polling basis. Printer configuration changes, Device Status Alerts, and changes to the printer front panel are passed from the Printer State Task 38 to the NPA Task 31 for communication to attached host computers.

It will be understood that other hardware and software configurations for implementing the laser printer 13 could be substituted for the illustrated embodiment without departing from the principles of the present invention. This is particularly true for the arrangement of software/firmware used by laser printer 13, as depicted in FIG. 3—the Options Manager 37 and its method of controlling the NVRAM could be designed to operate in various manners, while still effectively performing the same tasks.

The preferred laser printer 13 will include an operator control panel which can be either manually-accessed by a local user, or remotely-accessed over the LAN by a Network Administrator. Such laser printers are currently available, as described in a co-pending commonly-assigned U.S. patent application, Ser. No. 08/394,086, titled REMOTE REPLICATION OF PRINTER OPERATOR PANEL, filed Feb. 24, 1995, and which is expressly incorporated by reference herein.

It will be understood that the precise embodiments illustrated in FIGS. 2 and 3 are not required to perform the functions of the present invention, however, to utilize the NPAP industry standard, a laser printer must have bi-directional communications capability, and it must have the capability to store configuration information in a memory (preferably a non-volatile memory) that can be configured from a remote host computer. Furthermore, such a laser printer should have the capability of having its configuration information contents uploaded into a host computer, so that the host computer can store that same configuration information upon its own storage media, such as in a file residing on a hard disk drive. Once a file is created at the host computer, it will be understood that the contents of such file can either be directly downloaded to other laser printers on the network, or that the file's contents could be manipulated so that individual operating characteristics of a laser printer can be modified by a Network Administrator, although that extra individual manipulation capability may not be desirable in certain circumstances.

Figure 4:
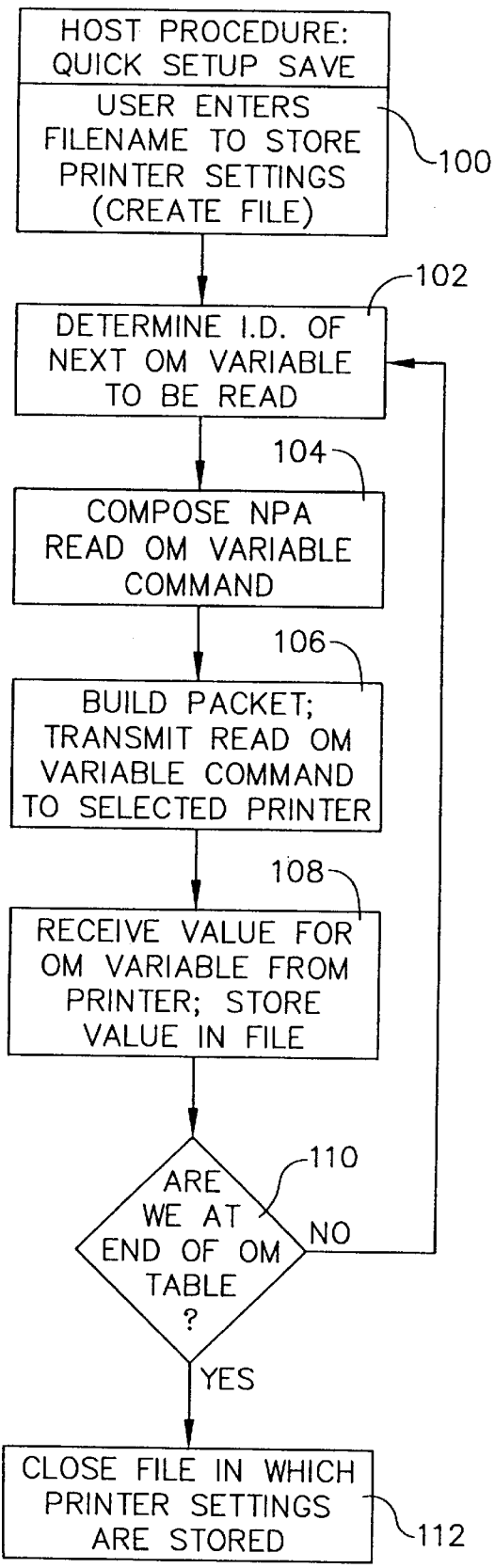
FIG. 4 is a flow chart of the operation of one of the host computers of FIG. 1, depicting the logical steps to perform a Quick Setup Save, according to the principles of the present invention.

FIG. 4 depicts a flow chart of the steps that the host computer (e.g., host 12) must undergo to create a file at its own storage media (e.g., upon its own hard disk drive) so as to save the configuration information of a particular printer (e.g., printer 13). The Network Administrator must access a computer program at the host 12, which preferably is a windows-compatible program such as Quick Setup™, manufactured by Lexmark International, Inc., located in Lexington, Ky. To perform a "Quick Setup" Save" command, the Network Administrator (i.e., the "user") enters a filename in which the printer settings of a particular laser printer are to be stored, according to the function block designated by the index numeral 100.

The filename chosen preferably either will create a new file to hold the printer settings, or will overwrite an existing file with such printer settings. In the next step, at function block 102, the identification of the next "OM" (Options Manager) variable to be read is determined. The Options Manager 37 (see FIG. 3) is one of the software modules that controls the operation of the laser printer 13. As related in greater detail hereinbelow, the configuration information of the preferred laser printer 13 is stored in random access memory (RAM), while the most important configuration variables are also stored in non-volatile random access memory (NVRAM).

Each model of laser printer may have its particular operating variables stored in different physical memory locations within the RAM on NVRAM, as compared to other models (even other models manufactured by Lexmark International, Inc.), however, the Options Manager 37 is designed to be able to easily retrieve and store all such configuration variables for its particular model laser printer. Because of this flexibility, all of the configuration variables pertaining to the configuration information described herein are referred to as "OM variables," and each such OM variable will have a corresponding NPA identification, normally given as a hexadecimal number. Table #1, presented below, lists the preferred OM variables for the preferred laser printer 13 of the present invention. Table #1 includes the NPA identification in hexadecimal, the name of the OM variable, the number of bytes it requires in NVRAM, the type of variable (e.g., whether it is a "systems" variable or a variable used by an interpreter), and a brief description of the variable.

TABLE 1

| NPA id (hex) | Name | NVRAM bytes | Var. type | Description |
|---|---|---|---|---|
| 0000 | OMNPAGES | 4 | sys | Number pages prinied |
| 0001 | OMEMULATION | 1 | sys | Default Emulation |
| 0003 | OMBLANKSUPPRESS | 1 | sys | Suppress blank pages |
| 0004 | OMPRNDARK | 1 | sys | Print Darkness |
| 0005 | OMPRINTTIMEOUT | 1 | sys | Formfeed timeout of non-PS |
| 0006 | OMHONORINIT | 1 | sys | Honor Init |
| 0007 | OMNCOPIES | 2 | sys | Number of copies |
| 0008 | OMPOWERSAV | 1 | sys | Power saver mode |
| 0009 | OMRESENHANCE | 1 | sys | Resolution Enhancement |
| 000B | OMDUPLEX | 1 | sys | Duplex (on/off) |
| 000C | OMHONORDSR | 1 | sys | Honor DSR |
| 000D | OMPRNCTRAS | 1 | sys | Print Contrast |
| 000E | OMBINDINGEDGE | 1 | sys | Duplex bind (long/short) |
| 000F | OMLANGUAGE | 1 | sys | Front Panet text language |
| 0010 | OMFASTBYTES | 1 | sys | Parallel protocol fastbytes |
| 0011 | OMMODNAMELN | 1 | sys | Mod Name Len (GR) |
| 0012 | OMMODNAMEFNT | 2 | sys | Mod Name Font ID (GR) |
| 0013 | OMMODNAMEFNTSZ | 4 | sys | Mod Name Font Size (GR) |
| 0014 | OMMODELNAME | 32 | sys | Model Name (GR) |
| 0016 | OMFONTSRCALL | 1 | sys | Font display (source/all) |
| 0017 | OMPAGEPROT | 1 | sys | Page protect mode |
| 0018 | OMRS232 RS422 | 1 | sys | RS232 vs RS422 |
| 0019 | OMRS422POLARITY | 1 | sys | Polarity of RS422 port |
| 001A | OMFLASHSTATUS | 4 | sys | Flash device status variable |
| 0020 | OMFLOWCNTL | 1 | sys | Serial flow control |
| 0021 | OMBAUD | 1 | sys | Serial baud rate |
| 0022 | OMPARITY | 1 | sys | Serial parity |
| 0023 | OMDATABITS | 1 | sys | Serial data bits |
| 0030 | OMPAPERSRC | 1 | sys | Default paper source |
| 0031 | OMT1PAPSZ | 1 | P/T | Tray 1 default size |
| 0032 | OMT2PAPSZ | 1 | P/T | Tray 2 default size |
| 0033 | OMMPPAPSZ | 1 | P/T | Man paper def size |
| 0034 | OMT1TYPE | 1 | P/T | Tray 1 paper type |
| 0035 | OMT2TYPE | 1 | P/T | Tray 2 paper type |
| 0036 | OMMPTYPE | 1 | P/T | Manual paper type |
| 0037 | OMORIENT | 1 | PCL | Default orientation |
| 0038 | OMENVENHANHT | 1 | sys | Env Enhance Height |
| 003B | OMLINKINP TRAY | 1 | P/T | Tray linkage |
| 003C | OMAEPAPSZ | 1 | P/T | Auto envelope default size |
| 003D | OMMEPAPSZ | 1 | P/T | Man envelope default size |
| 003F | OMAUXTYPE | 1 | P/T | Auxilliary paper type |
| 0040 | OMALARM | 1 | sys | Type of alarm |
| 0042 | OMENGTM | 1 | sys | Engine top margin |
| 0043 | OMENGLM | 1 | sys | Engine left margin |
| 0044 | OMENGLSPD | 1 | sys | Engine low speed (300 dpi) |
| 0045 | OMENGHSPD | 1 | sys | Engine high speed (600 dpi) |
| 0046 | OMTONEALRM | 1 | sys | Toner alarm |
| 0047 | OMWARMUPTIME | 1 | sys | Printer warmup time (0–5) |
| 0048 | OMFUSERTEMP | 1 | sys | Fuser temp |
| 0049 | OMENVENHANCE | 1 | sys | Envetope Enhance |
| 004A | OMUSNONUS | 1 | sys | US/NONUS fLag |
| 004B | OMLOWLINEV | 1 | sys | Fuser low line volt index |
| 004C | OMMAINTCT | 4 | sys | Maintenance count |

TABLE 1-continued

| NPA id (hex) | Name | NVRAM bytes | Var. type | Description |
|---|---|---|---|---|
| 004D | OMMENUDISABLE | 1 | sys | Front Panel menu disable |
| 004E | OMAUTOCONT | 1 | sys | Auto Continue |
| 0050 | OMFONTSRC | 1 | PCL | Default font source |
| 0051 | OMFONTNUM | 2 | PCL | Default font position |
| 0052 | OMSYMSET | 2 | PCL | Default symbol set |
| 0053 | OMVMI | 4 | PCL | Default PCL VMI |
| 0054 | OMFONTSIZE | 4 | PCL | Font char point size |
| 0055 | OMA4WIDTH | 1 | PCL | A4 logical width |
| 0060 | OMCRLF | 1 | PCL | CRLF flag |
| 0061 | OMLFCR | 1 | PCL | LFCR flag |
| 006A | OMFONTPITCH | 4 | PCL | Font pitch or scalable |
| 0073 | OMPRECACHE | 1 | PS | Font precache |
| 0074 | OMDOPAGETYPE | 1 | PS | Set default page type |
| 007B | OMJobTimeout | 4 | PS | Job timeout |
| 007C | OMManualFeedTimeout | 4 | PS | Manual feed timeout |
| 007D | OMWaitTimeout | 4 | PS | Wait timeout |
| 0081 | OMRESOLUTIONX | 2 | PS | Resolution of printer in X |
| 0082 | OMRESOLUTIONY | 2 | PS | Resolution of printer in Y |
| 0083 | OMPSERROR | 1 | PS | Print PS errors |
| 0085 | OMJAMRECOVERY | 1 | PS | Jam recovery |
| 0088 | OMPrinterName | 33 | PS | PS printer name |
| 0089 | OMDOSYSSTART | 1 | PS | Do sysstart file init |
| 00D5 | OMLINKPS SERIAL | 1 | Oth | Sniff for PS? |
| 00D6 | OMLINKPCL5 SERIAL | 1 | Oth | Sniff for PCL5? |
| 00DC | OMLINKPS PARALLEL | 1 | Oth | Sniff for PS? |
| 00DD | OMLINKPCL5 PARALLEL | 1 | Oth | Sniff for PCL5? |
| 00E3 | OMLINKPS NETWORK | 1 | Oth | Sniff ror PS? |
| 00E4 | OMLINKPCL5 NETWORK | 1 | Oth | Sniff for PCL5? |
| 00EA | OMLINKPS NETWORK2 | 1 | Oth | Sniff for PS? |
| 00EB | OMLINKPCL5 NETWORK2 | 1 | sys | Sniff for PCL5? |
| 0101 | OMRESRCSAVE | 1 | sys | Resource Save |
| 0102 | OMDLTARGET | 1 | sys | Download Target |
| 0103 | OMErrorLogPtr | 1 | sys | Pointer to last errlog entry |
| 0104 | OMErrorLog1 | 1 | sys | Error Number |
| 0105 | OMErrorLog2 | 1 | sys | Error Number |
| 0106 | OMErrorLog3 | 1 | sys | Error Number |
| 0107 | OMErrorLog4 | 1 | sys | Error Number |
| 0108 | OMErrorLog5 | 1 | sys | Error Number |
| 0109 | OMErrorLog6 | 1 | sys | Error Number |
| 0119 | OMLogSizeDisk | 2 | PS | Size to format disk |
| 011A | OMDISKSTATUS | 4 | sys | Disk device status variable |
| 011B | OMPICTUREGRADE | 1 | PS | PS Imaging (halftone) |
| 011C | OMFactoryDefaults | 1 | PS | Restore defaults (T/F) |
| 011D | OMFatalErrorAddress | 4 | PS | |
| 011E | OMMaxFontCache | 4 | PS | Max bytes for font cache |
| 011F | OMStartJobPassword | 33 | PS | string of 32 + null |
| 0120 | OMSystemParamsPassword | 33 | PS | string of 32 + null |
| 0121 | OMPageSizes | 5 | PS | Num input srcs and location |
| 0122 | OMGenericResourceDir | 18 | PS | Location of gen resources |
| 0123 | OMFontResourceDir | 18 | PS | Location of external fonts |
| 0124 | OMMaxDisplayList | 4 | PS | Max bytes avail for disp lists |
| 0125 | OMMaxFormCache | 4 | PS | Max bytes avail for form cache |
| 0126 | OMMaxOutlineCache | 4 | PS | Max bytes for cache char outlines |
| 0127 | OMMaxPatternCache | 4 | PS | Max bytes avail for pattern cache |
| 0129 | OMMaxScreenStorage | 4 | PS | Max bytes for halftone screens |
| 012A | OMMaxSourceList | 4 | PS | Max bytes for source lists |
| 012B | OMMaxUPathCache | 4 | PS | Max bytes for user path cache |
| 012C | OMValidNV | 1 | PS | Determines validity of NVRAM |
| 012F | OMBlackOverPrint | 1 | PS | |
| 0130 | OMNPAMODE NETWORK | 1 | Oth | NPA Mode off(0)/ on(1)/ auto(2) |
| 0131 | OMNPAMODE PARALLEL | 1 | Oth | NPA Mode off(0)/ on(1)/ auto(2) |
| 0132 | OMNPAMODE SERIAL | 1 | Oth | NPA Mode off(0)/ on(1)/ auto(2) |
| 0135 | OMNPAMODE NETWORK2 | 1 | Oth | NPA Mode off(0)/ on(1)/ auto(2) |
| 0138 | OMTRAYRENUMBER | 1 | P/T | Tray Renumber |
| 0139 | OMADVANCEDSTATUS | 1 | PJL | |
| 013A | OMFOWTPRIORITY | 1 | PJL | |
| 013B | OMP JL PASSWORD | 2 | PJL | |
| 013C | OMAUTOCLEAN | 1 | Diag | |
| 013D | OMAUTOCLEANFREQ | 1 | Diag | |
| 013E | OMAUTOCLEANDELAY | 1 | Diag | |
| 0140 | OMChecksum | 1 | P/T | |
| 0141 | OMTRAYPROTECT | 1 | P/T | Tray Protect-Tray 1 |
| 0142 | OMTRAYPROTECT | 1 | P/T | Tray Protect-Tray 2 |
| 0143 | OMTRAYPROTECT | 1 | P/T | Tray Protect-Feeder |
| 0144 | OMPRINTBUFFER | 1 | sys | Print Buffer On/Off |
| 0145 | OMPERMNPAGES | 4 | sys | Permanent Page Count |

TABLE 1-continued

| NPA id (hex) | Name | NVRAM bytes | Var. type | Description |
|---|---|---|---|---|
| 0146 | OMECONOMODE | 1 | sys | Economy Mode |
| 0147 | OMTRAYPROTECT | 1 | P/T | Tray Protect-Man Env |
| 0148 | OMTRAYPROTECT | 1 | P/T | Tray Protect-Man Pap |
| 014B | OMDRAM | 1 | sys | Amount of DRAM |
| 014C | OMPARALLEL MODE1 | 1 | sys | Pull up resistors enable or not |
| 014D | OMPARALLEL MODE2 | 1 | sys | Pull up resistors enable or not |
| 014E | OMNARROWMEDIA | 1 | P/T | Determine if NARROWMEDIA or not Tray 1 |
| 014F | OMNARROWMEDIA | 1 | P/T | Determine if NARROWMEDIA or not Tray 2 |
| 0150 | OMNARROWMEDIA | 1 | P/T | Determine if NARROWMEDIA or not Feeder |
| 0151 | OMAUTOSIZE | 1 | P/T | Set AutoSizeSensing for tray 1 |
| 0152 | OMAUTOSIZE | 1 | P/T | Set AutoSizeSensing for tray 2 |
| 0153 | OMPSREGSIZE | 1 | sys | How deep the PS register is |
| 0154 | OMPCLREGSIZE | 1 | sys | How deep the PCL register is |
| 0155 | OMRESET | 1 | sys | Display reset on Front Panel |
| 0156 | OMTRANSFER | 1 | Diag | |
| 0157 | OMCHARGE | 1 | Diag | |
| 0158 | OMOUTPUTCAP | 2 | P/T | Output Drawer Capacity |
| 0159 | OMINPUTCAP | 2 | P/T | Input Tray 1 Capactty |
| 015A | OMSERIALNUM | 8 | sys | |
| 015B | OMENGINE DATA | 8 | sys | |
| 015C | OMDUP TOPMARGIN | 1 | sys | |
| 015D | OMTASKVAR | 1 | sys | |
| 0170 | OMLINKINP FEEDER | 1 | P/T | Feeder Linkage |
| 0171 | OMTRAYPROTECT | 1 | P/T | Tray 3 Protect |
| 0172 | OMNARROWMEDIA | 1 | P/T | Narrow Media Tray 3 |
| 0173 | OMAUTOSIZE | 1 | P/T | AUTOSIZE Sensing Tray 3 |
| 0174 | OMPAPERSIZE | 1 | P/T | Paper Size Tray 3 |
| 0175 | OMPAPERTYPE | 1 | P/T | Paper Type Tray 3 |
| 0176 | OMTRAYPROTECT | 1 | P/T | Feeder 2 Protect |
| 0177 | OMNARROWMEDIA | 1 | P/T | Narrow Media Feeder2 |
| 0178 | OMPAPERSIZE | 1 | P/T | Paper Size Feeder 2 |
| 0179 | OMPAPERTYPE | 1 | P/T | Paper Type Feeder 2 |
| 0180 | OMROBUSTXON | 1 | P/T | |
| 300 | OMBALANCE | 1 | sys | |
| 301 | OMPRINTMETHOD | 1 | sys | |
| 302 | OMLOADMETHOD | 1 | sys | |
| 303 | OMATNODE | 1 | sys | |
| 305 | OMGLAUTOEJ | 1 | sys | |
| 306 | OMGLAUTOSCALING | 1 | sys | |
| 307 | OMCOLORMODEL | 1 | sys | |
| 308 | OMBRIGHTNESS | 1 | sys | |
| 309 | OMCONRAST | 1 | sys | |
| 30a | OMBLANKPAGE | 1 | sys | |
| 30b | OMInkColors | 1 | sys | |
| 30c | OMBLUEADJUST | 1 | PS | |

Referring again to FIG. 4, function block 102 (as described above), determines the identification of (lie next OM variable to be read. After that has occurred, the printer composes an NPA (i.e., Network Printer Alliance) "Read OM Variable command," as per the function block 104. At function block 106, a packet is built to be transmitted over LAN 15, and which will have a protocol according to NPAP. At this point, the read OM variable command is transmitted to the selected printer.

Host computer 12 now waits until it receives a reply from the selected printer. Once that reply has been received, the value for that OM variable is stored, as per function block 108, in the file corresponding to the filename selected at function block 100. The next step is decision block 110, which asks the question whether or not we have reached the end of the OM table. If the answer is NO, then the logical flow returns to function block 102 to repeat the steps to determine the value of the next OM variable from the laser printer. If the answer to decision block 110 is YES, then the logical flow arrives at function block 112, at which time the contents of the file that contains the printer settings (i.e., the printer OM variable values) are stored, and the file is closed.

The laser printer setup can originate via manual procedure by a user manipulating the operator panel directly at a particular laser printer, or the setup can originate via a Network Administrator entering information at a host computer using NPA protocol commands to configure a laser printer via a network or a direct communications cable. In both situations, the setup will ultimately be loaded into the laser printer, and this information can then be transferred to the host using a Quick Setup Save command. Alternatively, the printer's setup could be made on the host computer without communicating to any particular laser printer. In this setup mode, the setup data would be stored on the host computer's hard disk drive, for transfer to a laser printer at a later time.

Figure 5:
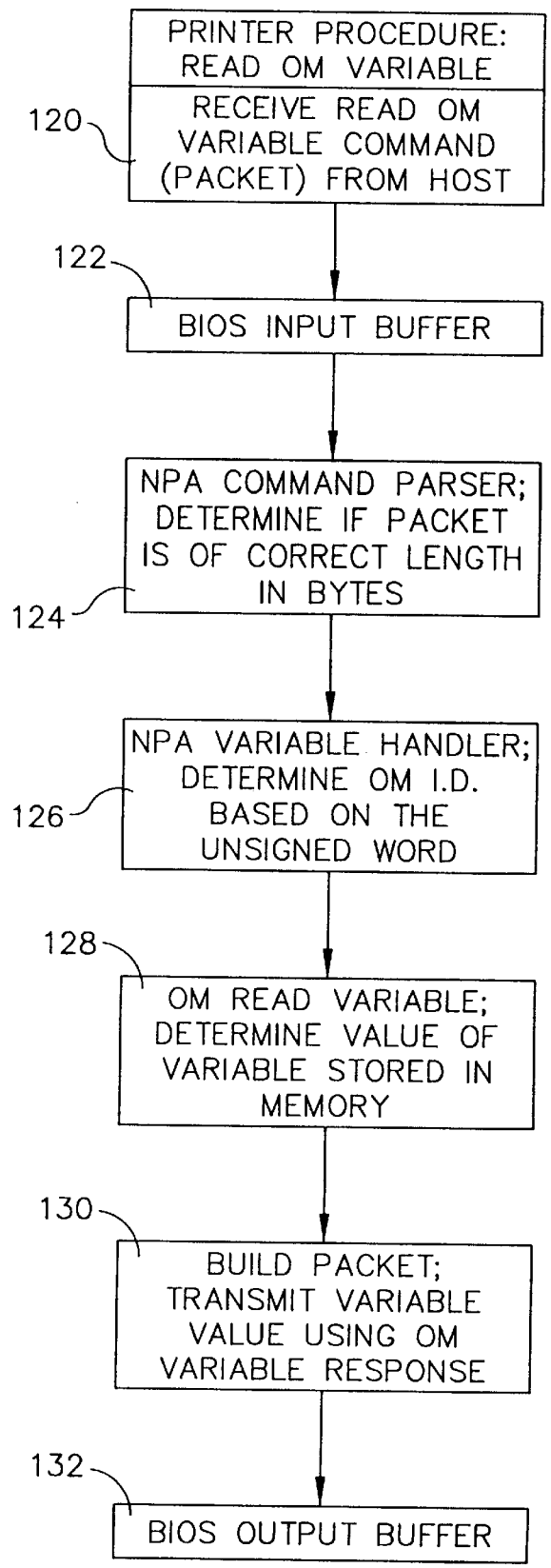
FIG. 5 is a flow chart of the operation of one of the printers depicted in FIG. 1, showing the logical operational steps required to read a variable that is stored in the printer, according to the principles of the present invention.

FIG. 5 shows a flow chart of the procedure to be performed by the printer 13 upon the reception of a "Read OM Variable" command from a host. This command is generated by the process described in FIG. 4, when the host computer performs a "Quick Setup SAVE" procedure, and transmits the Read OM Variable command to the printer. At function block 120, the printer receives the Read OM Variable command, which is a packet of information from the host that corresponds to the NPA protocol. This packet is communicated to a BIOS input buffer, which is a combination of hardware and software, as described hereinabove as index numeral 32 on FIG. 3. According to function block 122, the packet received at the BIOS input buffer will be held until an NPA Command Parser (a combination of firmware and software) is available.

Once it becomes available, the NPA Command Parser will determine if the packet that has been received is of the correct length, according to function block 124. This received packet will preferably have the format:

A5 00 06 50 E0 E7 00 [oid1] [oid2].

The variables "oid1" and "oid2" have meanings that correspond to the NPA identification listed along the left-hand column of Table #1. The definitions of the individual hexadecimal numbers (i.e., the bytes) of the packet are given in Table #2, hereinbelow. In the illustrated embodiment, data validation is not performed, except to check the data size of the received packet. As noted in Table #2, the second and third bytes of the host packet (i.e., the bytes having values 00 and 06) correspond to the length of the packet in bytes that follow. In the case of a host-sent packet corresponding to a Read OM Variable command, this number of bytes should always be equal to six (6), hence the format for this packet will always be 00 06 in hexadecimal.

TABLE #2

Host Command
Command: Lexmark Extension
Subcommand: Read/Write Options Manager Variables
Function: Read Options Manager Variable

| Byte | Value - Hex | Description | Notes |
|---|---|---|---|
| 1 | A5 | Start of Packet Byte | Packet Header |
| 2 | 00 06 | Length in Bytes (Does not include these 2 bytes nor the SOP byte) | Packet Header |
| 1 | Unsigned Byte | Flag | |
| 1 | E0 | Command: Lexmark Extension | |
| 1 | E7 | Subcommand: Read/Write Options Manager Variables | Data Field |
| 1 | 00 | Function: Read Options Manager Variable | |
| 2 | Unsigned Word | NPA id for the desired OM option. | |

Once the packet length has been validated, according to function block 126 an NPA Variable Handler determines the OM identification based upon the unsigned word, which makes up the last two bytes of the received data packet. The OM identifier may be different for each model of laser printer, even though manufactured by the same company. The Options Manager 37 is designed to keep track of this OM identifier for each NPA identification, as presented in Table #1.

Once the OM identifier has been determined, function block 128 will read that particular OM variable to determine its value as stored in the memory of the printer 13. It is preferred that the OM variables are all stored in RAM, for ease of access and quickness of operation. The same variables should preferably also be stored in non-volatile memory, such as NVRAM, but reading the values of variables from such non-volatile memory usually takes much longer, and would slow the system operation as compared to reading from RAM.

Once the variable value has been determined, function block 130 will build a packet that is to be transmitted back to the host 12. This packet is to be configured as an OM variable response according to function block 130, and, in the situation where the NPA Command Parser at function block 124 has found the correct packet length of the received Read OM Variable command, will have a format as follows:

A5 00 xx 50 E0 E7 00 [oid1] [oid2] [data],

This printer response is described in greater detail in Table #3, which indicates that the data field is of variable length, depending on what specific OM variable has been requested by the host 12. OM variables preferably range in size from 1 byte to 33 bytes, and since some of the OM variables are specific to emulators (e.g., PostScript, PCL, etc.), the data format of these variables may be different. After the packet has been built by function block 130, it will be physically transmitted through the BIOS output buffer, designated by the index numeral 132.

TABLE #3

Printer Response
Command: Lexmark Extension
Subcommand: Read/Write Options Manager Variables
Function: Read Options Manager Variable

| Byte | Value - Hex | Description | Notes |
|---|---|---|---|
| 1 | A5 | Start of Packet Byte | Packet Header |
| 2 | Unsigned Word | Length in Bytes (Dose not include these 2 bytes nor the SOP byte) | Packet Header |
| 1 | Unsigned Byte | Flag | |
| 1 | E0 | Command: Lexmark Extension | |
| 1 | E7 | Subcommand: Read/Write Options Manager Variables | Data Field |
| 1 | 00 | Function: Read Options Manager Variables | |
| 2 | Unsigned Word | ID of the options that was requested. | |
| n | | The value of the requested options. What is returned is dependent on the variable requested. | |

Note:
The size of the response depends on the specific OM variable. OM variables range in size from 1 byte to 33 bytes. Also, since some OM variables are specific to emulators (PS, PCL, etc.) the data format of these variables may be different.

If the packet length was incorrect, or the [oid1] and [oid2] values representing the NPA identification were not found in the look-up table inspected by the NPA Variable Handler at function block 126, then the printer response will be quite different, as follows:

A5 00 03 D8 E0 E7.

This response indicates that a failure has occurred, and the host computer 12 will act accordingly upon a reception of such a failed message. Host 12 would preferably resend the same Read OM Variable command upon this occurrence.

Figure 6:
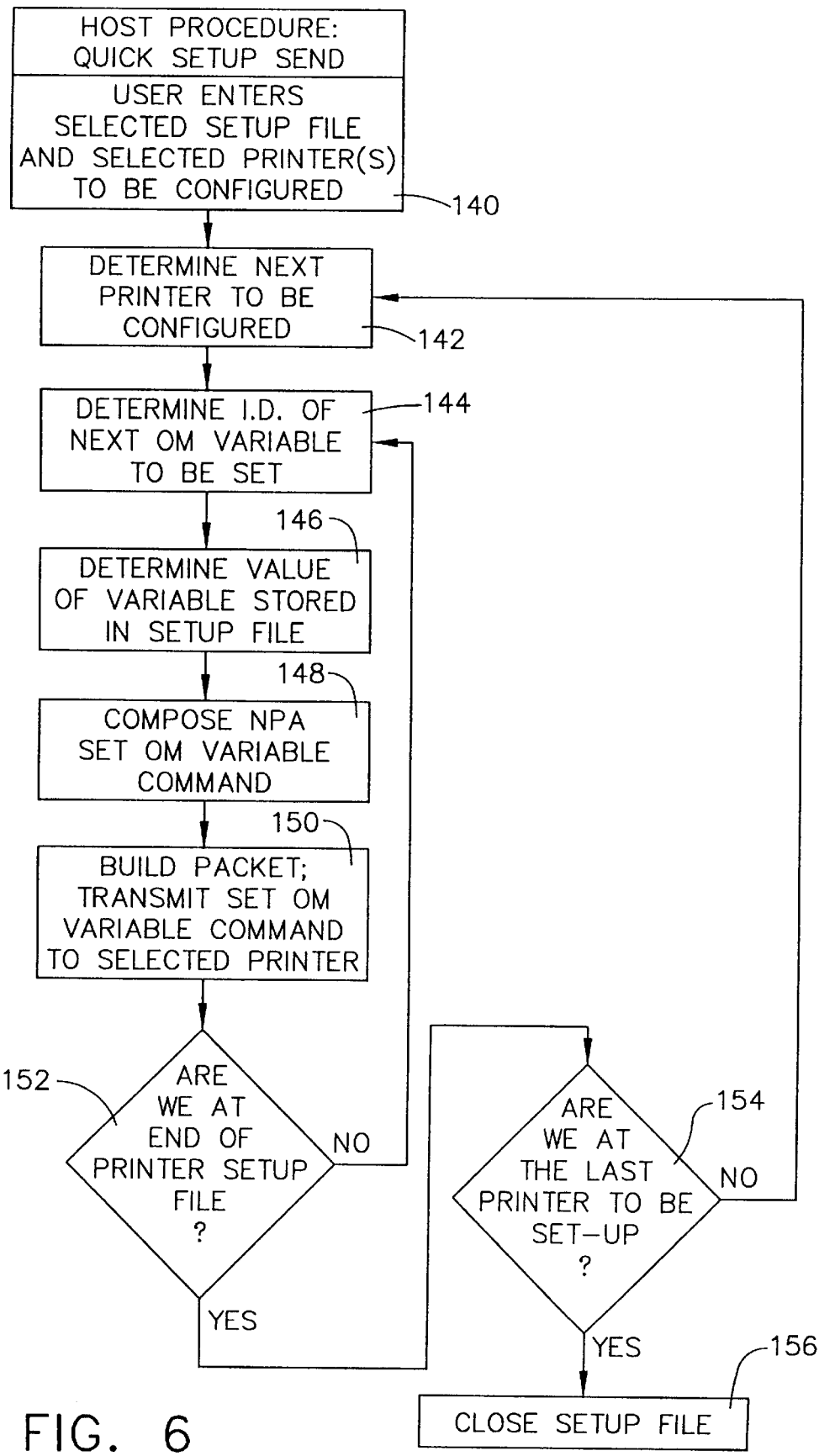
FIG. 6 is a flow chart of the operation of one of the host computers depicted in FIG. 1, showing the logical operational steps to perform a Quick Setup Send command, according to the principles of the present invention.

FIG. 6 depicts a flow chart of the logical steps performed by the host computer 12 to implement a "Quick Setup" Send procedure. This procedure is used by a Network Administrator who has already stored a particular printers setup (i.e., its configuration) on the hard drive of the host computer. The file on the hard drive can be accessed and its contents sent to other printers on the LAN 15, thereby configuring such other printers very quickly and easily. Under normal circumstances, it is preferred that such setup or configuration information for a particular printer be utilized on other printers having the identical model number.

At function block 140, the Systems Administrator (i.e., the "user") enters the filename of the selected setup file and enters the selected printer or printers to be configured by this Quick Setup Send procedure. Assuming that more than one printer is to be configured by a single command, a list of printers will be temporarily stored at host computer 12. At the next function block 142, it is determined which of the printers is next to be configured. At the next function block 144, the identification of the next OM variable to be set is determined.

At function block 146, the value of the present OM variable is determined from the stored information in the setup file that was entered at function block 140. Based upon this variable value and its OM identifier, function block 148 composes an NPA "Set OM Variable" command. Function block 150 then builds a packet and transmits that packet as a Set OM Variable command to the selected printer. The form of this packet is as follows:

A5 00 xx 50 E0 E7 01 [oid1] [oid2] [data].

In this Set OM Variable case, certain data validation is preferably performed at the laser printer 13 in tile illustrated embodiment. Laser printer 13 determines whether or not the data is an acceptable value and whether or not the data for a particular attribute (i.e., for an OM variable) corresponds to the options and configuration of printer 13. If a particular printer is instructed to change an attribute for a feature not installed on the printer (e.g., if paper tray 3 is being set to size A4 paper, and a third paper tray is not installed on this printer), it will ignore this Set OM Variable command. Data size checking preferably is also performed. A detailed description of the individual bytes of the above packet is provided in Table #4, below.

TABLE #4

Host Command
Command: Lexmark Extension
Subcommand: Read/Write Options Manager Variables
Function: Set Options Manager Variables with Validation

| Byte | Value - Hex | Description | Notes |
|---|---|---|---|
| 1 | A5 | Start of Packet Byte | Packet |
| 2 | Unsigned Word | Length in Bytes (Does not include these 2 bytes nor the SOP byte) | Header |
| 1 | Unsigned Byte | Flag | |
| 1 | E0 | Command: Lexmark Extension | |
| 1 | E7 | Subcommand: Read/Write Options Manager Variables | Data Field |
| 1 | 01 | Function: Set Options Manager Variables with Validation | |
| 2 | Unsigned Word | NPA ID of the variable to change. | |
| n | | New value for the variable. | |

After the Set OM Variable command has been transmitted, decision block 152 determines whether we are at the end of the printer setup file or not. If the answer to that question is NO, then the logical flow is directed back to function block 144, to index to the next OM variable to be set at printer 13. If the answer to the question is YES, then the logical flow arrives at another decision block 154, which determines whether we have arrived at the last printer to be setup. If the answer to this question is NO, then the logical flow travels back to function block 142 to index to the next printer to be configured. If the answer is YES, then the logical flow arrives at function block 156, which closes the setup file.

Figure 7:
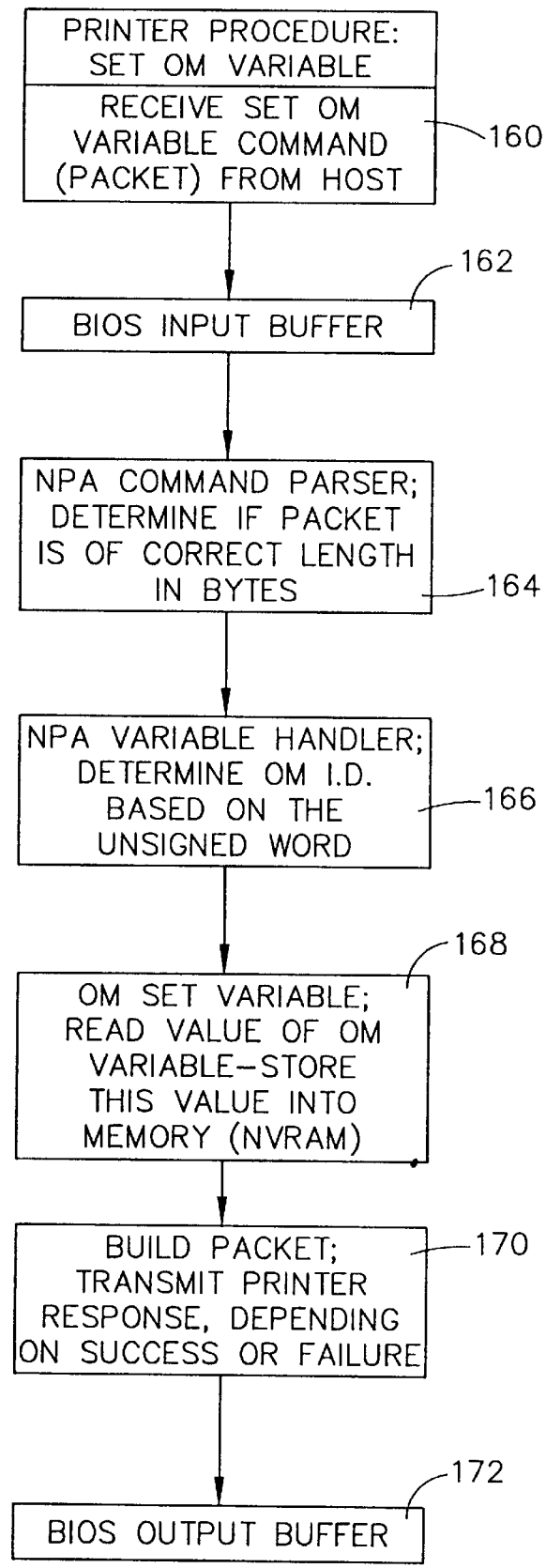
FIG. 7 is a flow chart of the operation of one of the printers depicted in FIG. 1, showing the logical operational steps required to set one of the variables in the laser printer, according to the principles of the present invention.

FIG. 7 depicts the flow chart of the logical steps that the laser printer performs during a Set OM Variable procedure. At decision block 160, a Set OM Variable command is received in the form of a packet from the host computer 12. This packet is passed into the BIOS input buffer, which according to function block 162, holds the packet until an NPA Command Parser is available.

Once the NPA Command Parser is available at function block 164, it determines if the packet is of tile correct length and the number of bytes. As related above, data validation is performed in the illustrated embodiment including data size checking to detect whether or not the proper number of bytes have been received for this particular packet. In this circumstance, the number of bytes is variable, since the data size is variable, as indicated by the hexadecimal number "xx," as detailed in Table #4, depicted above.

Once the Parser has determined that the packet is of the correct length, the NPA Variable Handler determines the OM identification, which is based upon the unsigned word, according to function block 166. As related hereinabove, the Options Manager is in control of the memory systems of laser printer 13, and for every NPA identification, it determines a particular OM identifier and knows what memory location in physical RAM the associated variable is to be stored into or read from.

According to function block 168, an OM Set Variable procedure next occurs, in which the value of the OM variable is read (from the data packet) and stored into memory. In the preferred embodiment, the value of this variable is also stored directly into non-volatile memory, such as NVRAM. In this manner, after each OM Set Variable procedure has occurred, its value will riot be lost even upon a power failure of printer 13.

The next step, according to function block 170, is to build a packet that is to be transmitted back to the host computer 12. This printer response depends upon whether or not the host packet was successfully received, or a failure was detected. As related hereinabove, a failure response will be transmitted if the data size checking failed, or if the [oid1] and [oid2] NPA identification was not acceptable by this particular laser printer 13. The "success" printer response has a format as described in detail in Table #5 below, as follows:

A5 00 06 50 E0 E7 01 [oid1] [oid2].

TABLE #5

Printer Response
Command: Lexmark Extension
Subcommand: Read/Write Options Manager Variables
Function: Set Options Manager Variables with Validation

| Byte | Value - Hex | Description | Notes |
|---|---|---|---|
| 1 | A5 | Start of Packet Byte | Packet |
| 2 | 00 06 | Length in Bytes (Does not include these 2 bytes nor the SOP byte) | Header |
| 1 | Unsigned Byte | Flag | |
| 1 | E0 | Command: Lexmark Extension | |
| 1 | E7 | Subcommand: Read/Write Options Manager Variables | Data Field |
| 1 | 01 | Function: Set Options Manager Variables with Validation | |
| 2 | Unsigned Word | NPA ID of the variable to change. | |

Notes
The command will be rejected if the option id is not found.
Data validation is performed, the set operation is not performed if the data validation fails.
Host Utility products (like MarkVision) should use this command for IBM 4039 Plus and Optra.

If the printer response is one of a failed reception of the Set OM Variable command from the host 12, the printer response will have the format:

A5 00 03 D8 E0 E7.

Whichever packet that is to be transmitted will be physically sent through the BIOS output buffer, according to function block 172. After that it will be sent via the LAN 15 to the host 12. It will be understood that the operational steps of the flow charts depicted in FIGS. 4–7 can be changed in many different ways without departing from the principles of the present invention.

An optional feature is for the host computer to "Read All OM Variables," in which one packet from the host computer 12 will generate a response from printer 13 in which all OM variables stored in that printer will be sent as one message. This type of communication must be used with care, since some of the OM variables pertain to specific printer operation, and are normally set during the manufacturing process. Such variables should not be reset by any message from the host computer, and the Read All OM Variables command is typically used only during manufacturing or during diagnostic testing of the laser printer.

The format of the host message for the Read All OM Variables command preferably is as follows:

A5 00 04 50 E0 E7 02.

The appropriate printer response would be of the format as follows:

A5 00 xx 70 E0 E7 02 [oid1] [oid2] [data]—first packet

A5 00 xx 70 E0 E7 02 [oid1] [oid2] [data]—second packet

A5 00 xx 70 E0 E7 02 [oid1] [oid2] [data]—:

A5 00 xx 50 E0 E7 02 [oid1] [oid2] [data]—last packet

The host packet is described in detail in Table #6, below, and response packet is described in detail in Table #7, below. The "Continue" Flag, which is bit 5 of the Flag byte, is set ON for every packet, except for the last packet. It should be noted, that in the Read All OM Variables situation, the data packets are not necessarily in order of NPA identification number.

TABLE #6

Host Command
Command: Lexmark Extension
Subcommand: Read/Write Options Manager Variables
Function: Read all Options Manager Variables

| Byte | Value - Hex | Description | Notes |
|---|---|---|---|
| 1 | A5 | Start of Packet Byte | Packet Header |
| 2 | 00 04 | Length in Bytes (Does not include these 2 bytes nor the SOP byte) | Header |
| 1 | Unsigned Byte | Flag | |
| 1 | E0 | Command: Lexmark Extension | |
| 1 | E7 | Subcommand: Read/Write Options Manager Variables | Data Field |
| 1 | 02 | Function: Read all Options Manager Variables | |

TABLE #7

Printer Response
Command: Lexmark Extension
Subcommand: Read/Write Options Manager Variables
Function: Read all Options Manager Variables

| Byte | Value - Hex | Description | Notes |
|---|---|---|---|
| 1 | A5 | Start of Packet Byte | Packet Header |
| 2 | Unsigned Word | Length in Bytes (Does not include 2 bytes nor the SOP byte) | Header |
| 1 | Unsigned Byte | Flag | |
| 1 | E0 | Command: Lexmark Extension | |
| 1 | E7 | Subcommand: Read/Write Options Manager Variables | Data Field |
| 1 | 02 | Function: Read all Options Manager Variables | |
| 2 | Unsigned Word | NPA ID of the variable. | |
| n | | Value of the variable being returned. | |

Notes
A data packet is returned for every supported OM variable.
The Continue flag (bit 5 of Flag byte) is ON for every packet, EXCEPT the last one.
Data packets are not in 'oid' order.
WARNING: At this time this command does not return the same value as the Read Options Manager Variable (E0 E7 00) command for certain variables.

As related hereinabove, not all of the variables stored in a particular laser printer 13 should necessarily be sent to a particular host computer 12. Consequently, the only OM variables that are transmitted and received by the host 12 and printer 13 during a Quick Setup Save procedure, (i.e., a Read OM Variable procedure) or a Quick Setup Send procedure (i.e, a Set OM Variable procedure) have to do with printer features that are capable of being common throughout several printers within a network. Such variables would include information such as the tray default size of the various trays that are attached to a laser printer, or whether the default size of the envelope is an automatic or manual, the default font source or default font position, or the default symbol set, etc. A list of the OM variables communicated during a Quick Setup for a Lexmark model 4039 plus is provided in Table #8 below. The OM variables communicated during a Quick Setup for a Lexmark model Optra is provided below in Table #9.

TABLE 8

(Lexmark 4039 plus)

| [oid1] | [oid2] |
|---|---|
| 00 | 30 |
| 00 | 31 |
| 00 | 32 |
| 00 | 33 |
| 00 | 3C |
| 00 | 3D |
| 00 | 37 |
| 00 | 0B |
| 00 | 0E |
| 00 | 07 |
| 00 | 3B |
| 01 | 41 |
| 01 | 42 |
| 01 | 43 |
| 00 | 55 |
| 00 | 34 |
| 00 | 35 |
| 00 | 36 |
| 00 | 3F |
| 01 | 38 |
| 00 | 49 |
| 00 | 03 |
| 00 | 16 |
| 00 | 50 |
| 00 | 51 |
| 00 | 54 |
| 00 | 6A |
| 00 | 52 |
| 01 | 02 |
| 00 | 01 |
| 01 | 01 |
| 00 | 53 |
| 00 | 17 |
| 00 | 85 |
| 00 | 05 |
| 00 | 7D |
| 00 | 7B |
| 00 | 7C |
| 00 | DD |
| 00 | DC |
| 01 | 31 |
| 01 | 39 |
| 00 | D6 |
| 00 | D5 |
| 01 | 32 |
| 00 | E4 |
| 00 | E3 |
| 01 | 30 |
| 00 | 4E |
| 00 | 04 |
| 00 | 81 |
| 00 | 82 |
| 01 | 1B |
| 00 | 08 |
| 00 | 09 |
| 00 | 40 |
| 00 | 46 |
| 00 | 83 |

TABLE 8-continued (Lexmark 4039 plus)

| [oid1] | [oid2] |
|---|---|
| 00 | 10 |
| 00 | 06 |
| 00 | 18 |
| 00 | 19 |
| 00 | 20 |
| 00 | 21 |
| 00 | 23 |
| 00 | 22 |
| 00 | 0C |
| 00 | 60 |
| 00 | 61 |
| 00 | 0F |

TABLE 9

(Lexmark Optra)

| [oid1] | [oid2] |
|---|---|
| 00 | 30 |
| 00 | 31 |
| 00 | 32 |
| 00 | 33 |
| 00 | 3C |
| 00 | 3D |
| 00 | 37 |
| 00 | 0B |
| 00 | 0E |
| 00 | 07 |
| 00 | 3B |
| 01 | 41 |
| 01 | 42 |
| 01 | 43 |
| 00 | 55 |
| 00 | 34 |
| 00 | 35 |
| 00 | 36 |
| 00 | 3F |
| 01 | 38 |
| 00 | 49 |
| 00 | 03 |
| 01 | 4E |
| 01 | 4F |
| 01 | 50 |
| 00 | 16 |
| 00 | 50 |
| 00 | 51 |
| 00 | 54 |
| 00 | 6A |
| 00 | 52 |
| 00 | 01 |
| 00 | 81 |
| 00 | 82 |
| 00 | 08 |
| 01 | 01 |
| 01 | 02 |
| 00 | 05 |
| 00 | 09 |
| 00 | 04 |
| 01 | 1B |
| 00 | 53 |
| 00 | 85 |
| 00 | 17 |
| 00 | 4E |
| 00 | 0F |
| 00 | DD |
| 00 | DC |
| 01 | 31 |
| 01 | 39 |
| 00 | 10 |
| 00 | 06 |
| 01 | 4C |

TABLE 9-continued (Lexmark Optra)

| [oid1] | [oid2] |
|---|---|
| 01 | 4D |
| 00 | D6 |
| 00 | D5 |
| 01 | 32 |
| 00 | 18 |
| 00 | 19 |
| 00 | 20 |
| 00 | 21 |
| 00 | 23 |
| 00 | 22 |
| 00 | 0C |
| 00 | 60 |
| 00 | 61 |
| 00 | 40 |
| 00 | 46 |
| 01 | 51 |
| 01 | 52 |
| 00 | 7D |
| 00 | 7B |
| 00 | 7C |
| 00 | 83 |

The OM variables listed in Tables #8 and #9 generally are subsets of the OM variables listed in Table #1, and the NPA identification in hexadecimal of Table #1 corresponds to the [oid1] and [oid2] identifiers in Tables #8 and #9. It will be understood that the types of variables and their identification numbers as depicted in the tables herein can be changed in many different ways without departing from the principles of the present invention.

Figure 8:
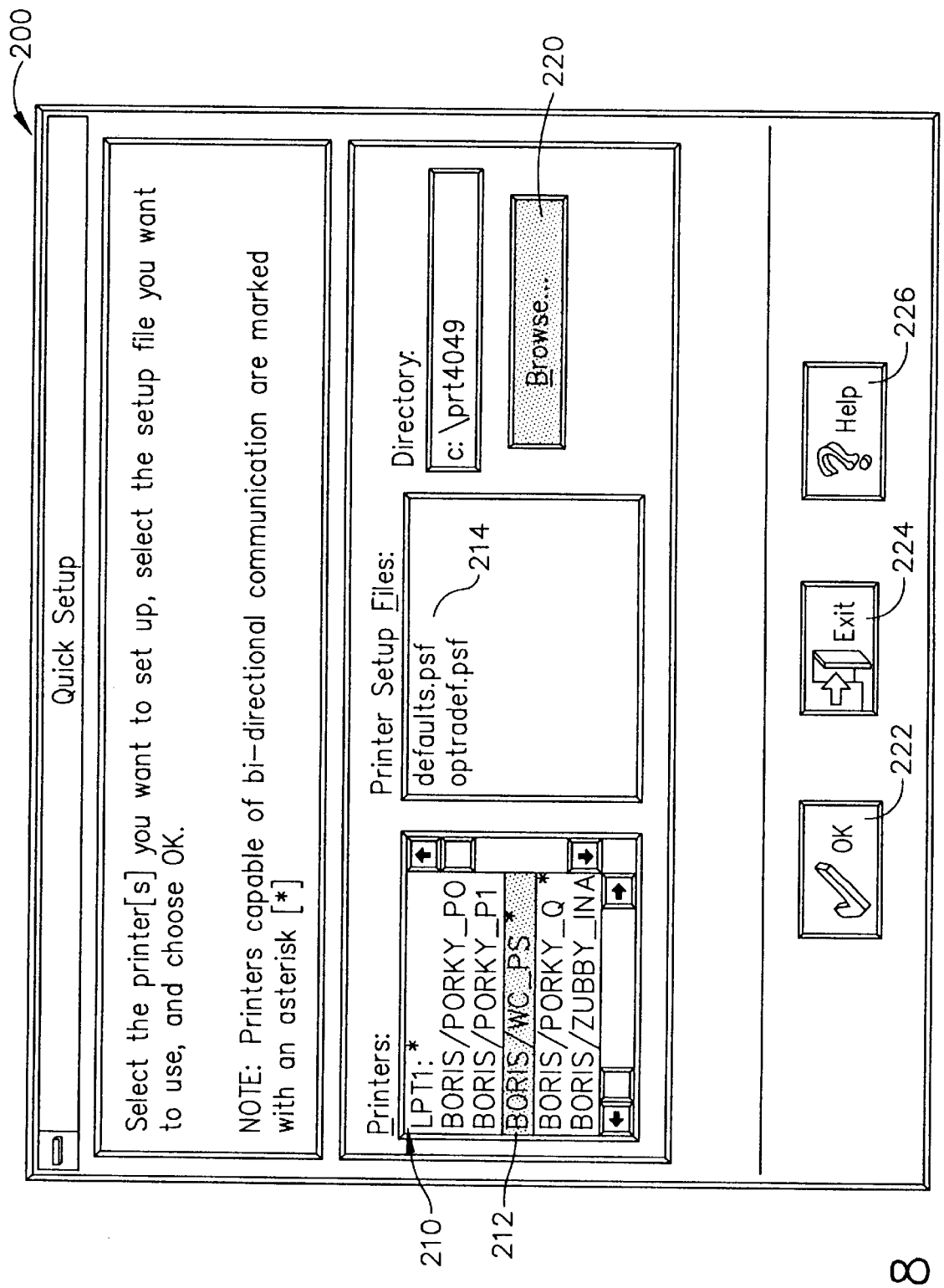
FIG. 8 is a diagrammatic view of one of the display screens of the host computer depicted in FIG. 1, while utilizing the "Quick Setup" feature according to the present invention.

FIG. 8 shows a typical Windows™ display, designated by the index numeral 200, for the "Quick Setup" function. A list of printers in the network is provided at index numeral 210, and those printers having bi-directional communications capabilities are noted with an asterisk, such as that indicated by index numeral 212.

The existing printer setup files are listed at the index numeral 214. Either one of these setup files can be chosen by the Network Administrator for future downloading to existing or new printers to be added to LAN 15. As in most Windows applications, the Quick Setup window 200 will change its appearance depending upon which mode it is currently being operated under, and as depicted on FIG. 8, the current mode is "Browse," as indicated by the index numeral 220. Other functional buttons in the Quick Setup window 200 include an "OK" button 222, and "Exit" button 224, and a "Help" button 226. It will be understood that the Quick Setup window 200 could be configured in many other ways without departing from the principles of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for configuring the physical setup of a plurality of printers from a host computer by way of a network, said method comprising:

(a) creating a data set at a host computer, said data set containing information to physically configure a printer;
(b) transmitting, using a single command operation entered at said host computer by a user, said data set by way of a communications port on said host computer to a network; and
(c) receiving said data set from said network by way of a communications port of each of a plurality of printers, then, without maintaining a dialog between any of said plurality of printers and said host computer which would otherwise allow the host computer to inspect the existing configuration of said plurality of printers, automatically physically configuring each of said plurality of printers with information contained in said data set, thereby physically configuring each of said plurality of printers to an identical operational setup.

2. The method as recited in claim 1, wherein the step of receiving said data set at each of said plurality of printers further includes NPAP processing by a Network Printing Alliance Protocol processing circuit capable of receiving and transmitting information that conforms to the Network Printing Alliance Protocol.

3. The method as recited in claim 1, wherein the step of automatically configuring each of said plurality of printers includes the use of an Options Manager to control the reading from and writing to operations of a non-volatile random access memory within each said printers, said non-volatile random access memory containing setup information that configures each said printers, based upon said data set.

4. The method as recited in claim 1, wherein the step of creating a data set at said host computer further comprises storing a data file on a hard disk drive.

5. The method as recited in claim 1, wherein the step of receiving said data set at each of said plurality of printers includes data size validation.

6. A method for configuring the physical setup of a plurality of printers from a host computer by way of a network, said method comprising:
(a) creating a data set at a host computer, said data set containing information to physically configure a printer;
(b) transmitting said data set, using a single command operation entered at said host computer by a user and without maintaining a dialog between any of said plurality of printers and said host computer which would otherwise allow the user at said host computer to inspect the existing configuration of any of said plurality of printers, by way of a communications port on said host computer to a network; and
(c) receiving said data set from said network by way of a communications port of each of a plurality of printers, and automatically configuring the physical setup of each of said plurality of printers with information contained in said data set, thereby causing each of said plurality of printers to physically operate with an identical operational setup, without reference to any printer driver file residing on said host computer.

7. The method as recited in claim 6, wherein the step of receiving said data set at each of said plurality of printers further includes NPAP processing by a Network Printing Alliance Protocol processing circuit capable of receiving and transmitting information that conforms to the Network Printing Alliance Protocol.

8. The method as recited in claim 6, wherein the step of automatically configuring each of said plurality of printers includes the use of an Options Manager to control the reading from and writing to operations of a non-volatile random access memory within each said printers, said non-volatile random access memory containing setup information that configures each said printers, based upon said data set.

9. The method as recited in claim 6, wherein the step of creating a data set at said host computer further comprises storing a data file on a hard disk drive.

10. The method as recited in claim 6, wherein the step of receiving said data set at each of said plurality of printers includes data size validation.

11. A networked printing system having a host computer and a plurality of printers, said networked printing system comprising:
(a) a host computer having a first memory circuit for storage of data, a first communications port that is effectively connected to at least one external device by way of a network, and a first processing circuit that is configured to control the flow of data between said first memory circuit and said first communications port, said first processing circuit also being configured to create a data set at a host computer and to, in conjunction with said first communications port, transmit said data set from said host computer to said network without maintaining a dialog between said host computer and said at least one external device connected to said network that would otherwise allow said user to inspect an existing configuration of said at least one external device, said data set containing information used for physically configuring a printer; and
(b) a plurality of printers, each of said printers having a second memory circuit for storage of data, a second communications port that is effectively connected to at least one external device by way of said network, and a second processing circuit that is configured to control the flow of data between said second memory circuit and said second communications port, said second processing circuit being further configured to, in conjunction with second communications port, receive said data set from said network and to use information contained in said data set to automatically configure the physical setup of each of said plurality of printers, thereby causing each of said plurality of printers to physically operate with an identical operational setup, without reference to any printer driver file residing on said host computer.

12. The printing system as recited in claim 11, further comprising a Network Printing Alliance Protocol processing circuit capable of receiving and transmitting information that conforms to the Network Printing Alliance Protocol.

13. The printing system as recited in claim 11, further comprising an Options Manager to control the reading from and writing to operations of a non-volatile random access memory within each said printers, said non-volatile random access memory containing setup information that configures each said printers, based upon said data set.

14. The printing system as recited in claim 11, wherein said first processing circuit is further configured to store a data file on a hard disk drive.

15. The printing system as recited in claim 11, wherein said second processing circuit is also configured to perform data size validation.

* * * * *